(12) United States Patent
Yuan

(10) Patent No.: US 11,774,792 B2
(45) Date of Patent: *Oct. 3, 2023

(54) DISPLAY DEVICE INCLUDING A PHOTOSENSITIVE LAYER AND A COLLIMATION LAYER AND ELECTRONIC DEVICE

(71) Applicant: GUANGDONG OPPO MOBILE TELECOMMUNICATIONS CORP., LTD., Guangdong (CN)

(72) Inventor: Shilin Yuan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/592,155

(22) Filed: Feb. 3, 2022

(65) Prior Publication Data

US 2022/0155628 A1   May 19, 2022

Related U.S. Application Data

(63) Continuation of application No. 16/909,409, filed on Jun. 23, 2020, now Pat. No. 11,300,823.

(30) Foreign Application Priority Data

Jun. 24, 2019 (CN) .......................... 201910548879.6

(51) Int. Cl.
*G02F 1/1333* (2006.01)
*H04M 1/02* (2006.01)
*G06V 40/13* (2022.01)

(52) U.S. Cl.
CPC ...... *G02F 1/13338* (2013.01); *G06V 40/1318* (2022.01); *H04M 1/0266* (2013.01)

(58) Field of Classification Search
None
See application file for complete search history.

(56) References Cited

U.S. PATENT DOCUMENTS

| 2010/0214236 | A1* | 8/2010 | Kim .................... | G06F 3/04182 |
| | | | | 345/173 |
| 2012/0200546 | A1* | 8/2012 | Miyamoto .......... | G02F 1/13338 |
| | | | | 257/66 |

(Continued)

FOREIGN PATENT DOCUMENTS

| CN | 105678255 A | 6/2016 |
| CN | 106773229 A | 5/2017 |
| CN | 109740556 A | 5/2019 |

OTHER PUBLICATIONS

Chinese Notification to Grant Patent Right for Invention with English Translation for CN Application 201910548879.6 dated Apr. 8, 2022. (6 pages).

(Continued)

*Primary Examiner* — Kirk W Hermann
(74) *Attorney, Agent, or Firm* — Young Basile Hanlon & MacFarlane, P.C.

(57) ABSTRACT

A display device includes a first substrate, a photosensitive layer, a liquid crystal layer, a second substrate, and a collimation layer that are stacked successively. The photosensitive layer comprises photosensitive units. The second substrate comprises display units and a shutter layer having first holes, any adjacent two of the display units are spaced by the shutter layer, and one of the first holes is located between any adjacent two different ones of the display units. The collimation layer comprises collimators, each of the collimators defines a second hole communicated with a corresponding one of the first holes and facing a corresponding one of the photosensitive units, and a light signal passes through the second hole and the corresponding one of the (Continued)

first holes and reaches the corresponding one photosensitive unit. Reflective-material is arranged on a side of each of the photosensitive units facing the first substrate.

13 Claims, 9 Drawing Sheets

(56) References Cited

U.S. PATENT DOCUMENTS

| | | | | |
|---|---|---|---|---|
| 2013/0009888 | A1* | 1/2013 | Park | G06F 3/0421 |
| | | | | 345/173 |
| 2016/0342256 | A1* | 11/2016 | Zhou | G02F 1/134309 |
| 2017/0161543 | A1* | 6/2017 | Smith | G06V 40/1318 |
| 2017/0344785 | A1* | 11/2017 | Zhang | G06V 40/1329 |
| 2018/0120149 | A1* | 5/2018 | Chung | G01S 17/04 |
| 2018/0211085 | A1 | 7/2018 | Liu et al. | |
| 2018/0239941 | A1 | 8/2018 | Mackey et al. | |
| 2018/0357460 | A1* | 12/2018 | Smith | G06V 40/1335 |
| 2018/0357462 | A1 | 12/2018 | Mackey et al. | |
| 2018/0357464 | A1* | 12/2018 | Wang | G06V 40/1347 |
| 2019/0056613 | A1* | 2/2019 | Wang | G02F 1/163 |
| 2019/0122025 | A1* | 4/2019 | Gove | G06V 40/1382 |
| 2019/0180072 | A1* | 6/2019 | Fomani | G06V 40/1324 |
| 2020/0311373 | A1* | 10/2020 | Lee | G06V 40/1306 |
| 2021/0165268 | A1* | 6/2021 | Yang | H01L 27/1248 |

OTHER PUBLICATIONS

Chinese Rejection Decision with English Translation for CN Application 201910548879.6 dated Nov. 25, 2021. (22 pages).

* cited by examiner

☐ effective operation time of display-driving units in a same row or column

■ effective operation time of photosensitive units in the same row or column

DISPLAY DEVICE INCLUDING A PHOTOSENSITIVE LAYER AND A COLLIMATION LAYER AND ELECTRONIC DEVICE

CROSS-REFERENCE TO RELATED APPLICATION(S)

This application is a continuation application of U.S. patent application Ser. No. 16/909,409, which claims priority to Chinese Patent Application No. 201910548879.6, filed on Jun. 24, 2019, the entire contents of both of which are herein incorporated by reference.

TECHNICAL FIELD

The present disclosure generally relates to the technical field of display, and in particular to a display device and an electronic device.

BACKGROUND

In related technologies, the mobile phone has been equipped with a fingerprint identification module and a display module. The fingerprint identification module can be used for identifying the user's identity, and the display module can be used for displaying images. Currently, there is a way that the fingerprint identification module is stacked below the display module. The user contacts a corresponding position of the display module on the fingerprint module such that a fingerprint is formed. However, in the display area of the display module, only a small part can be touched by users for fingerprint identification.

SUMMARY

Embodiments of the present disclosure provides a display device, an electronic device, and a method for obtaining an image.

According to one aspect of the present disclosure, a display device according to embodiments of the present disclosure includes a first substrate, a photosensitive layer, a liquid crystal layer, a second substrate, and a collimation layer that are stacked successively; wherein the photosensitive layer comprises a plurality of photosensitive units; wherein the second substrate comprises a plurality of display units and a shutter layer having a plurality of first holes, any adjacent two of the plurality of display units are spaced by the shutter layer, and one of the first holes is located between any adjacent two different ones of the plurality of display units; and wherein the collimation layer comprises a plurality of collimators, each of the plurality of collimators defines a second hole the second hole is communicated with a corresponding one of the first holes and faces a corresponding one of the photosensitive units, and a light signal passes through the second hole and the corresponding one of the first holes and reaches the corresponding one photosensitive unit; wherein reflective-material is arranged on a side of each of the plurality of photosensitive units facing the first substrate.

According to another aspect of the present disclosure, an electronic device according to embodiments of the present disclosure includes: a housing; and a display device installed in the housing and comprising a first substrate, a photosensitive layer, a liquid crystal layer, a second substrate, and a collimation layer that are stacked successively; wherein the photosensitive layer comprises a plurality of photosensitive units; wherein the second substrate comprises a plurality of display units and a shutter layer having a plurality of first holes, any adjacent two of the plurality of display units are spaced by the shutter layer, and each of the first holes is located between any adjacent two different ones of the plurality of display units; and wherein the collimation layer comprises a plurality of collimators, each of the plurality of collimators defines a second hole communicated with a corresponding one of the first holes and facing a corresponding one of the photosensitive units, and a light signal passes through the second hole and the corresponding one of the first holes and reaches the corresponding one photosensitive unit; wherein reflective-material is arranged on a side of each of the plurality of photosensitive units facing the first substrate.

According to yet another aspect of the present disclosure, an electronic device, comprising a display assembly comprising a first substrate, a photosensitive layer, a liquid crystal layer, a second substrate, and a collimation layer that are stacked successively; wherein the photosensitive layer comprises a set of photosensitive units comprising at least one photosensitive unit; wherein the second substrate comprises a plurality of display units and a shutter layer having a plurality of first holes, any adjacent two of the plurality of display units are spaced by the shutter layer, and each of the first holes is located between any adjacent two different ones of the plurality of display units; and wherein the collimation layer comprises a plurality of collimators, each of the plurality of collimators defines a second hole communicated with a corresponding one of the first holes and facing a corresponding one of the at least one photosensitive unit, and a light signal passes through the second hole and the corresponding one of the first holes and reaches the corresponding one photosensitive unit; wherein reflective-material is arranged on a side of the at least one photosensitive unit facing the first substrate.

Additional aspects and advantages of the present disclosure will be set forth in part in the following description. The part may become apparent from the description in the following, or be learnt about from the practice of the present disclosure.

BRIEF DESCRIPTION OF DRAWINGS

The above and/or additional aspects and advantages of the present disclosure will become apparent and readily understood from the following description in accordance with drawings.

DETAILED DESCRIPTION

Figure 1:
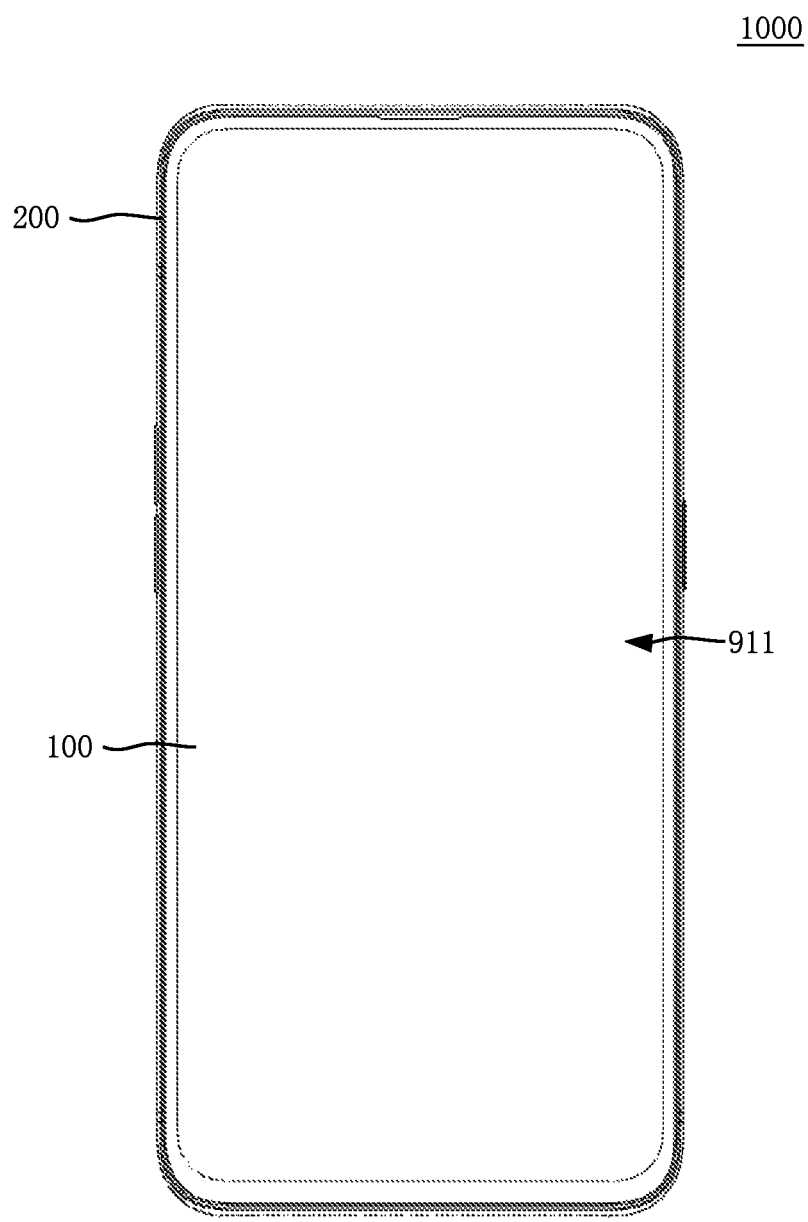
FIG. 1 is a structural view of an electronic device according to some embodiments of the present disclosure.

The embodiments of the present disclosure will be described in detail below. Examples of the embodiments may be illustrated in the drawings. Same or similar reference numerals may be used to indicate same or similar elements or elements having same or similar functions.

Further, the embodiments described below with reference to the drawings are illustrative and intended to describe the present disclosure, and are not intended to be construed as limiting of the present disclosure.

In the present disclosure, unless otherwise specification and limitation, a first feature being "above" or "below" a second feature may mean that the first feature is in direct contact with the second feature, or the first feature is in indirect contact with the second feature through an intermediate media. Moreover, the first feature being "on", "above", and "up" the second feature may mean that the first feature is directly or obliquely above the second feature, or only mean that the first feature has a horizontal height higher than that of the second feature. The first feature being "under" "below", "below" and "down" the second feature may mean that the first feature is directly below or obliquely below the second feature, or only indicate that the horizontal height of the first feature is less than that of the second feature.

A display device is provided, including a first substrate, a photosensitive layer, a liquid crystal layer, a second substrate, and a collimation layer that are stacked successively. Wherein the photosensitive layer includes a plurality of photosensitive units; wherein the second substrate includes a plurality of display units and a shutter layer having a plurality of first holes, any adjacent two of the plurality of display units are spaced by the shutter layer, and each of the first holes is located between any adjacent two different ones of the plurality of display units; and wherein the collimation layer includes a plurality of collimators, each of the plurality of collimators defines a second hole communicated with a corresponding one of the first holes and facing a corresponding one of the photosensitive units, and a light signal passes through the second hole and the corresponding one of the first holes and reaches the corresponding one photosensitive unit.

In some embodiments, the display device has a display surface including a display area, and projections of the plurality of photosensitive units on the display surface are located in the display area.

In some embodiments, the display device has a display surface, each collimator is made from light-absorbing material, and an extension direction of the second hole is perpendicular to the display surface.

In some embodiments, a ratio of a section width of the second hole to a depth of the second hole is less than 0.2.

In some embodiments, the shutter layer is located between the collimation layer and the plurality of photosensitive units, and projections of the plurality of collimators on the second substrate are located on the shutter layer.

In some embodiments, reflective-material is arranged on a side of each of the plurality of photosensitive units facing the first substrate.

In some embodiments, the plurality of photosensitive units are arranged in an array, and the plurality of photosensitive units include one or more of a plurality of stray light photosensitive units, a plurality of noise photosensitive units, and a plurality of infrared photosensitive units.

In some embodiments, the plurality of stray light photosensitive units are distributed in two columns of the array, and one of the two columns is adjacent to one of two opposite edges of the array and the other of the two columns is adjacent to the other of the two opposite edges of the array.

In some embodiments, the display device further includes a cover plate including a display surface and a back surface that are opposite to each other, an ink layer is arranged on the back surface, projections of the stray light photosensitive units on the back surface are located in an area where the ink layer is located, and the ink layer is configured for blocking an external light signal penetrating into the cover plate.

In some embodiments, the ink layer is arranged near an edge of the back surface.

In some embodiments, the plurality of noise photosensitive units are distributed in two second columns of the array, and one of the two second columns of the array is near one of two opposite edges of the array and the other of the two second columns of the array is near to the other of the two opposite edges of the array.

In some embodiments, the display device further includes a blocker, the blocker is arranged on a collimator facing a corresponding one of the noise photosensitive units and is configured for blocking the second hole of the collimator.

In some embodiments, the photosensitive layer further includes a plurality of circuit units including a plurality of photosensitive circuit units and one or more noise circuit unit, and each of the plurality of the photosensitive units is connected with one photosensitive circuit unit, each noise circuit unit is unconnected with any one of the plurality of the photosensitive units.

In some embodiments, the plurality of circuit units are arranged in an array including a plurality of rows and a plurality of columns, and the one or more noise circuit unit is arranged in at least one whole row and one whole column of the array.

In some embodiments, the plurality of infrared photosensitive units are evenly distributed in the array.

In some embodiments, a plurality of display-driving units are arranged on the first substrate and in a first array including a plurality of rows and a plurality of columns;

the plurality of photosensitive units are arranged in a second array including a plurality of rows and a plurality of columns;

each row of the first array is located between any adjacent two rows of the second array, and each column of the first array is located between any adjacent two columns of the second array; and the display-driving units have an effective operation time alternated with that of the photosensitive units in a same row or column.

An electronic device is further provided, including a housing and a display device installed in the housing and including a first substrate, a photosensitive layer, a liquid crystal layer, a second substrate, and a collimation layer that are stacked successively; wherein the photosensitive layer includes a plurality of photosensitive units; wherein the second substrate includes a plurality of display units and a shutter layer having a plurality of first holes, any adjacent two of the plurality of display units are spaced by the shutter layer, and each of the first holes is located between any adjacent two different ones of the plurality of display units; and wherein the collimation layer includes a plurality of collimators, each of the plurality of collimators defines a second hole communicated with a corresponding one of the first holes and facing a corresponding one of the photosensitive units, and a light signal passes through the second hole and the corresponding one of the first holes and reaches the corresponding one photosensitive unit.

In some embodiments, the plurality of photosensitive units are arranged in an array and include one or more of a plurality of stray light photosensitive units, a plurality of noise photosensitive units, and a plurality of infrared photosensitive units.

An electronic device is further provided, including a display assembly including a first substrate, a photosensitive layer, a liquid crystal layer, a second substrate, and a collimation layer that are stacked successively; wherein the photosensitive layer includes a set of photosensitive units including at least one photosensitive unit; wherein the second substrate includes a plurality of display units and a shutter layer having a plurality of first holes, any adjacent two of the plurality of display units are spaced by one of the first holes; and wherein the collimation layer includes a plurality of collimators, each of the plurality of collimators defines a second hole communicated with a corresponding one of the first holes and facing a corresponding one of the at least one photosensitive unit, and a light signal passes through the second hole and the corresponding one of the first holes and reaches the corresponding one photosensitive unit.

In some embodiments, the set of photosensitive units is arranged in an array include one or more of a plurality of stray light photosensitive units, a plurality of noise photosensitive units, and a plurality of infrared photosensitive units.

As shown in FIG. 1, the electronic device 1000 according to some embodiments of the present disclosure includes a housing 200 and a display device 100. The display device 100 is mounted on the housing 200. Specifically, the electronic device 1000 can be a mobile phone, a tablet computer, a display, a notebook computer, a teller machine, a gate machine, a smart watch, a head display device, a game machine and other devices. The present disclosure is described as taking the electronic device 1000 being a mobile phone as an example. It can be understood that the specific form of the electronic device 1000 is not limited to the mobile phone.

The housing 200 can be used for mounting the display device 100. In other words, the housing 200 can be used as an installation carrier for the display device 100. The housing 200 can also be used for mounting functional modules such as a power supply device, an imaging device, and a communication device of the electronic equipment 1000, and thus the housing 200 provides protection against falling, water and the like for the functional modules.

The display device 100 can be used for displaying images, videos, texts, etc. The display device 100 is installed on the housing 200. Specifically, the display device 100 can be mounted on the front of the housing 200, the display device 100 can be installed on the back of the housing 200, the display device 100 can be installed on the front and back of the housing 200 at the same time, or the display device 100 can be installed on a side of the housing 200, which are not limited herein. In an example shown in FIG. 1, the display device 100 is mounted on the front of the housing 200.

Figure 2:
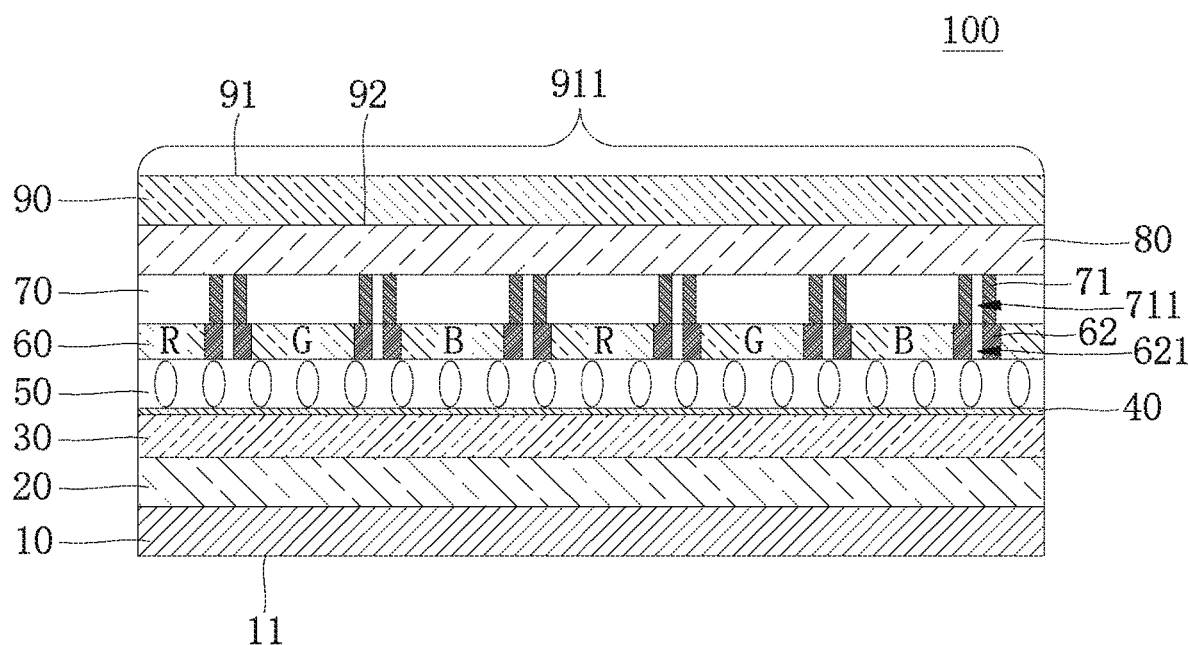
FIG. 2 is a cross-sectional view of a display device according to some embodiments of the present disclosure.
Figure 3:
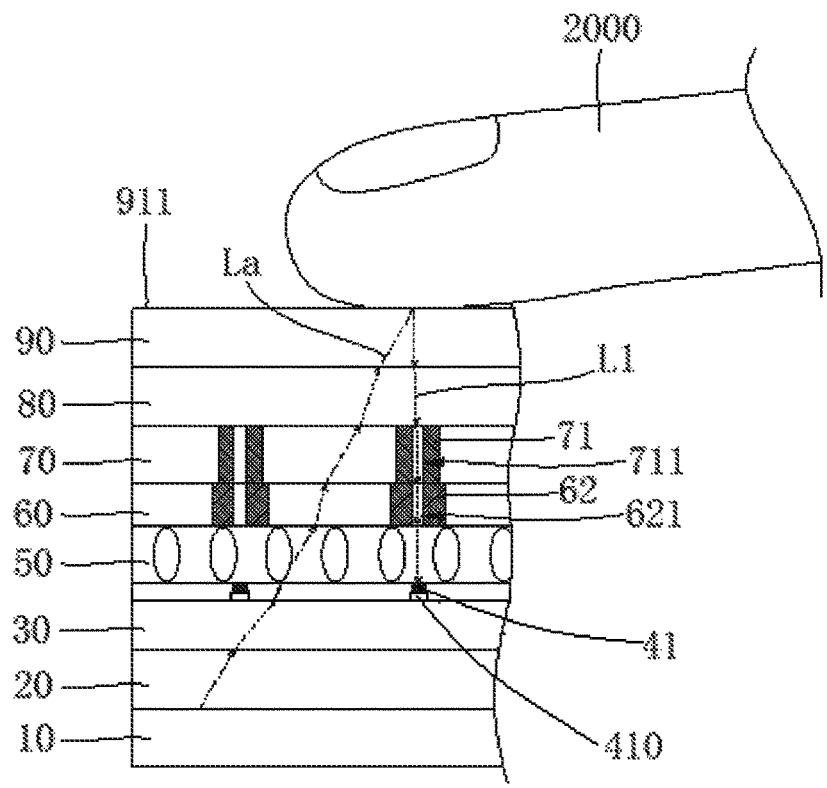
FIG. 3 is a principle diagram of a display device for fingerprint identification according to some embodiments of the present disclosure.
Figure 4:
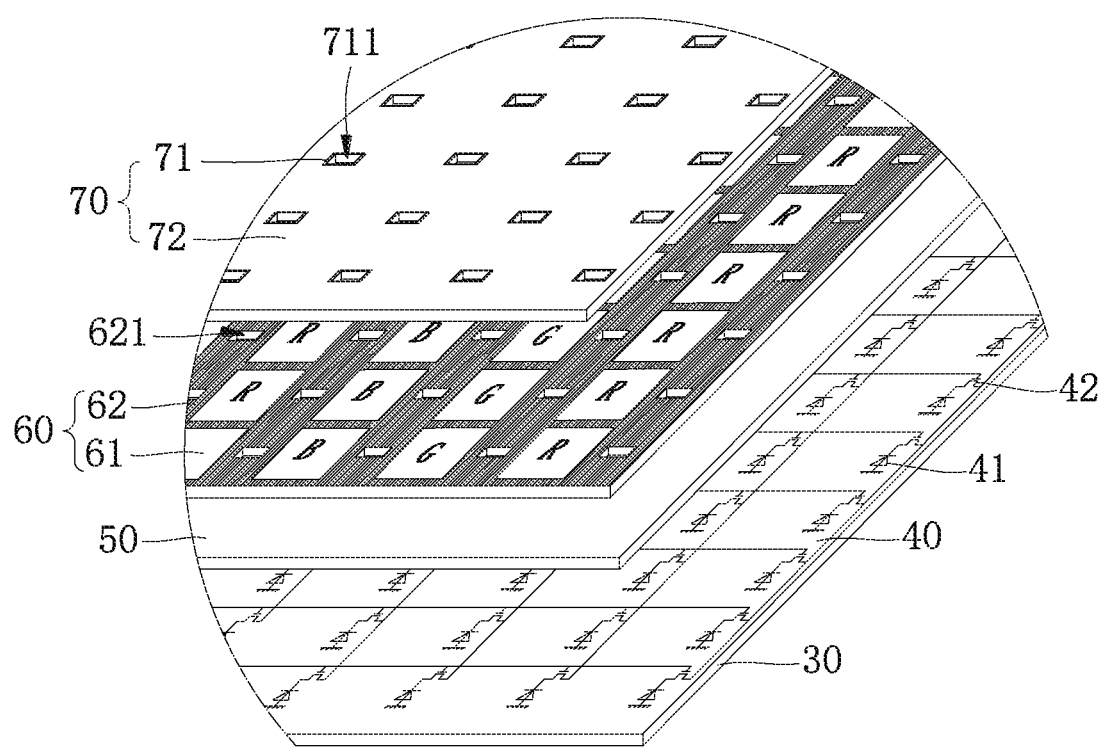
FIG. 4 is a stereoscopic view of a display device according to some embodiments of the present disclosure.

As shown in FIGS. 2-4, the display device 100 includes a first substrate 30, a photosensitive layer 40, a liquid crystal layer 50, a second substrate 60, and a collimation layer 70, which are stacked successively. The photosensitive layer 40 includes a plurality of photosensitive units 41. The second substrate 60 includes a plurality of display units 61 and a shutter layer 62. The shutter layer 62 defines light-passing holes 621, and any adjacent two of the plurality of display units are spaced by the shutter layer 62, and each of the first holes is located between any adjacent two different ones of the plurality of display units 61. The collimation layer 70 include a plurality of collimators 71 each of which defines a light-through hole 711. The light-through hole 711 is communicated with a corresponding one of the light-passing holes 621 and faces a corresponding one of the photosensitive units 41. A light signal passes through the light-through hole 711 and the corresponding one of the light-passing holes 621 and reaches the corresponding one photosensitive unit 41.

In the electronic device 1000 according to some embodiments of the present disclosure, the photosensitive units 41 can receive the light signals from the outside and passing through the light-through holes 711 and the light-passing holes 621. According to the light signals, an image of an object touching on the display device 100 can be obtained. The image can be used for fingerprint identification. At the same time, a ratio of an area of multiple photosensitive units 41 to an area of a display surface 91 of the display device 100 becomes large as the multiple photosensitive units 41 are distributed according to demands. Thus, fingerprint identification can be performed on a large region for users, and then the user experience is good.

Specifically, the display device 100 may display light signals sent from a light-emitting element therein. The display device 100 may also display light signals sent from an external light source. The display device 100 may be un-bendable, and the display device 100 may also be bendable, which is not limited herein.

In some embodiments of the present disclosure, as shown in FIGS. 2-4, the display device 100 includes a backlight layer 10, a first polarization layer 20, a first substrate 30, a photosensitive layer 40, a liquid crystal layer 50, a second substrate 60, a collimation layer 70, a second polarization layer 80, and a cover plate 90, which are successively arranged along a direction of lights emitted from the display device 100.

As shown in FIG. 2 and FIG. 3, the backlight layer 10 can be used for emitting a light signal La, or the backlight layer 10 can be used for guiding a light source (which is not shown in the figures) to emit the light signal La. The light signal La successively passes through the first polarization layer 20, the first substrate 30, the photosensitive layer 40, the liquid crystal layer 50, the second substrate 60, the collimation layer 70, the second polarization layer 80, and the cover plate 90, and then enters outside. The backlight layer 10 includes a bottom surface 11. In specific, the bottom surface 11 of the backlight layer 10 is opposite to the first polarization layer 20.

The first polarization layer 20 is arranged on the backlight layer 10. Specifically, the first polarization layer 20 can be a polarizer or a polarizing film. The first substrate 30 is arranged on the first polarization layer 20. The first substrate 30 can be a glass substrate.

Figure 5:
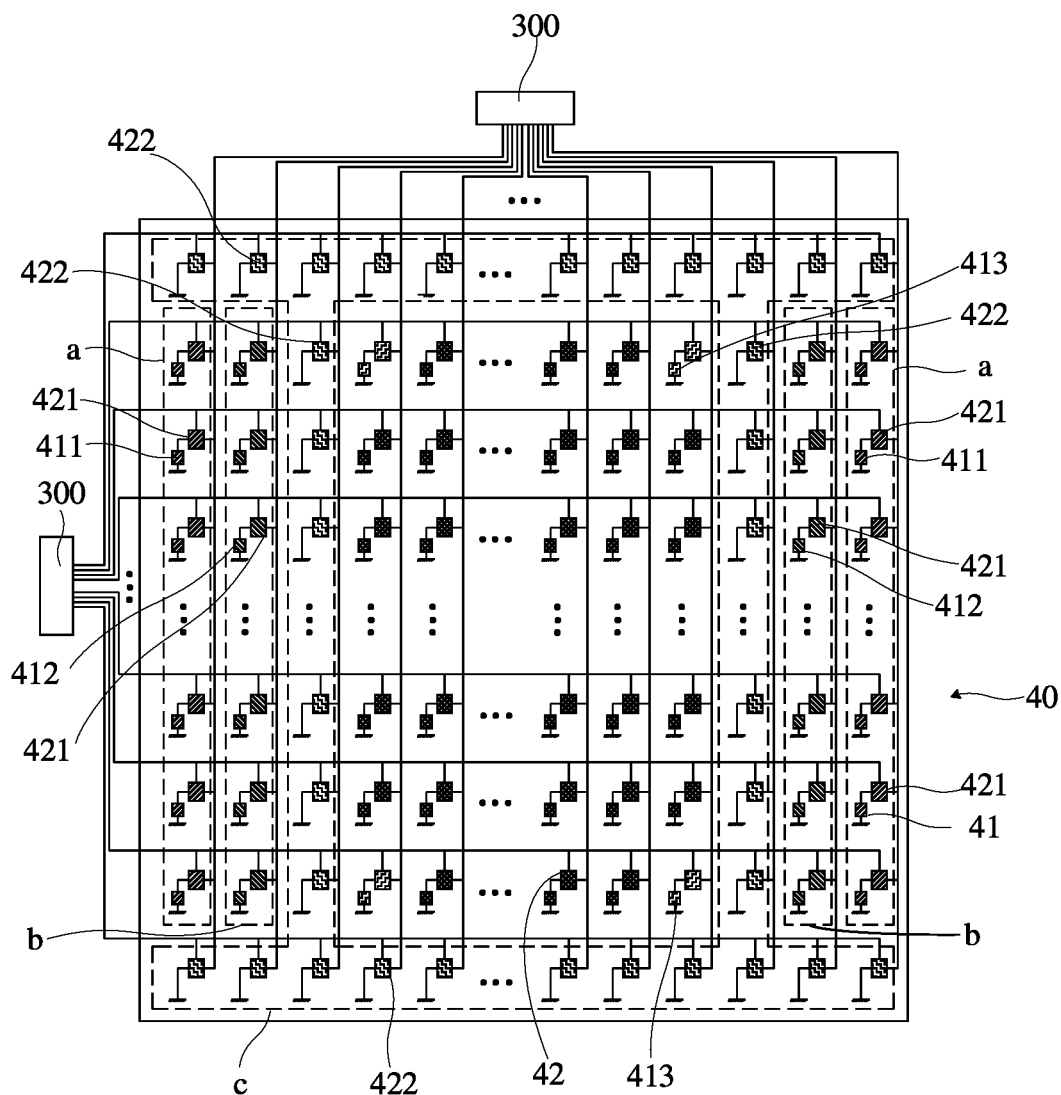
FIG. 5 is a structural view of a photosensitive layer and an imaging chip according to some embodiments of the present disclosure.
Figure 6:
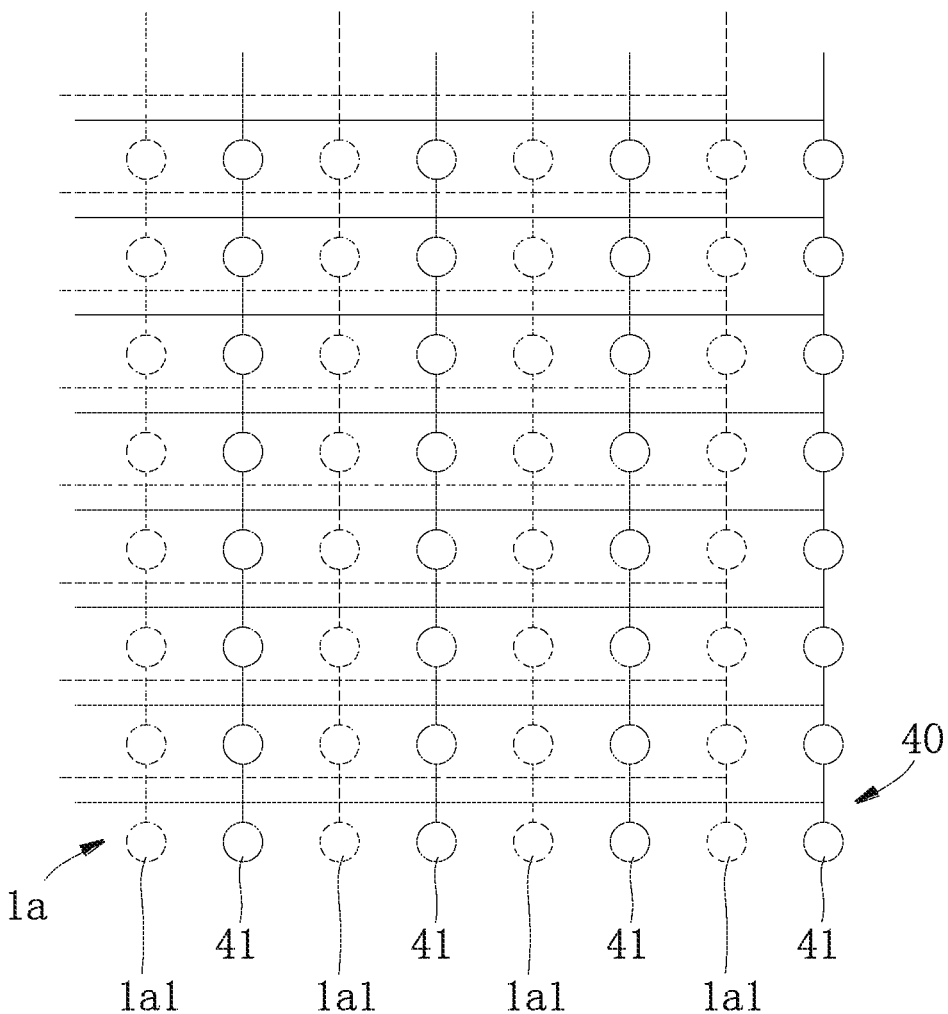
FIG. 6 is a structural view of a photosensitive layer and a display-driving layer according to some embodiments of the present disclosure.

The photosensitive layer 40 may be a film layer made on the first substrate 30, for example, by a TFT (thin film Transistor) process. As shown in FIGS. 4-6, the photosensitive layer 40 includes a plurality of photosensitive units 41 and a plurality of circuit units 42.

A photosensitive unit 41 can convert a received light signal into an electrical signal through the photoelectric effect. The intensity of the electrical signal generated by the photosensitive unit 41 indicates the intensity of the light signal received by the photosensitive unit 41. In one example, the photosensitive unit 41 may only receive a visible light signal to convert it into an electrical signal. In another example, the photosensitive unit 41 may only receive an invisible light signal to convert it into an electrical signal. In yet another example, the photosensitive unit 41 may receive both a visible light signal and an invisible light to convert them into an electrical signal. The plurality of photosensitive units 41 may have a same type, and the plurality of photosensitive units 41 may also have totally-different types from each other. The plurality of photosensitive units 41 can be arranged in any way, and the arrangement of the photosensitive units 41 can be specifically set according to a shape of the display device 100 and other requirements. In embodiments of the present disclosure, the plurality of photosensitive units 41 are arranged in an array. For example, the plurality of photosensitive units 41 are arranged in an array with multiple rows and multiple columns. Each photosensitive unit 41 can operate independently without being affected by other photosensitive units 41. Light signals received by the photosensitive units 41 at different positions may have different intensities, and thus electrical signals generated by the photosensitive units 41 at different positions may also have different intensities. Further, reflective-material 410 may be set at a side of the photosensitive units 41 toward the bottom surface 11. Light signals, which are irradiated from the backlight layer 10 to the photosensitive units 41, may be reflected by the reflective-material 410, so as to avoid the influence of these light signals on the accuracy of imaging by the photosensitive layer 40.

A circuit unit 42 may be connected to a photosensitive unit 41. The circuit unit 42 may transmit the electrical signals generated by the photosensitive unit 41 to an imaging chip 300 of the electronic device 1000. The circuit unit 42 may specifically include components such as a transistor. As the number of circuit units 42 may be multiple, each photosensitive unit 41 may be connected to one circuit unit 42. The multiple circuit units 42 may be connected to an imaging chip 300 through connection wires. The arrangement of the plurality of circuit units 42 may be similar to that of the photosensitive units 41. For example, the plurality of photosensitive units 41 may be arranged into an array with multiple rows and multiple columns, and the plurality of circuit units 42 may also be arranged into an array with multiple rows and multiple columns.

As shown in FIGS. 2-4, the liquid crystal layer 50 is arranged on the photosensitive layer 40. The deflection direction of Liquid crystal molecules in the liquid crystal layer 50 can be changed under the electric field, so as to change an amount of light signals that can pass through the liquid crystal layer 50. Accordingly, combined with FIG. 6, a display-driving layer 1$a$ can also be fabricated on the first substrate 30, and under the driving effect of a driving chip (not shown in the figures), the display-driving layer 1$a$ can apply an electrical field to the liquid crystal layer 50 to control the deflection direction of the liquid crystal molecules at different positions. Specifically, the display-driving layer 1$a$ includes a plurality of display-driving units 1$a$1, and each display-driving unit 1$a$1 can independently control the deflection direction of the liquid crystal molecules at a corresponding position.

Figure 7:
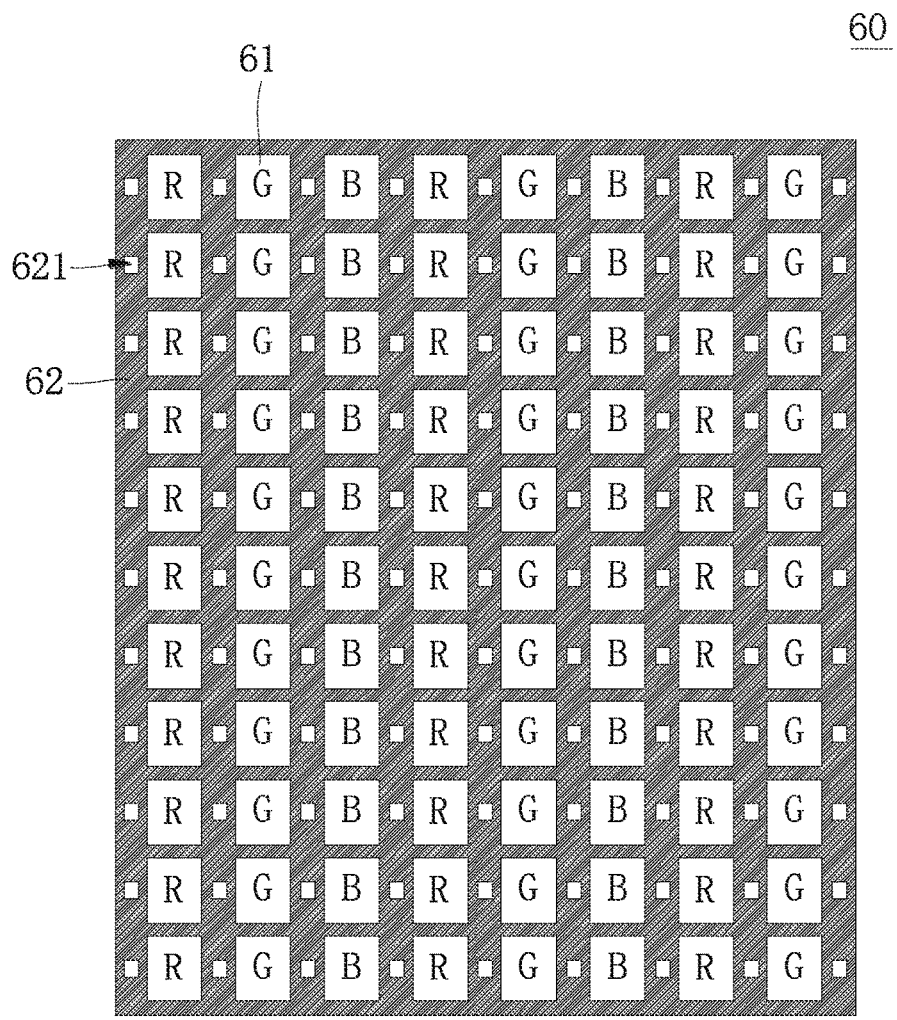
FIG. 7 is a plane view of a second substrate according to some embodiments of the present disclosure.

As shown in FIG. 2, FIG. 4, and FIG. 7, the second substrate 60 is arranged on the liquid crystal layer 50. The second substrate 60 may include a glass substrate and a plurality of display units 61 and a shutter layer 62 arranged on the glass substrate. The display units 61 may be a color filter, for example, R represents a red filter, G represents a green filter, and B represents a blue filter. The amount of light signals passing through filters for different colors is controlled to control the color finally displayed on the display device 100. The arrangement of the plurality of display units 61 may correspond to the arrangement of the plurality of display-driving units 1$a$1. For example, one display unit 61 is aligned with one display-driving unit 1$a$1.

Any two adjacent display units 61 are separated by the shutter layer 62. In one example, the shutter layer 62 may be a black matrix (BM). The shutter layer 62 can prevent light from passing through, so as to avoid the lights in the display device 100 from entering outside without passing through the display units 61. The shutter layer 62 can also prevent the phenomenon of optical crosstalk when the light signals pass through the adjacent display unit 61.

As shown in FIG. 3, the shutter layer 62 defines multiple light-passing holes 621. The light-passing holes 621 can be used for light signals to pass through. A light-passing hole 621 is aligned with a photosensitive unit 41, which means the center line of the light-passing hole 621 passes through the photosensitive unit 41. During a light signal passing through the light-passing hole 621, if the light signal reaches an inner wall of the light-passing hole 621, the light signal will be partially or completely absorbed by the inner wall of the light-passing hole 621. Thus, the propagation direction of the light signal that can pass through the light-passing hole 621 is almost coincided with an extension direction of the center line of the light-passing hole 621. The light-passing holes 621 are distributed in a manner same with that in which the photosensitive units 41 are distributed, so that each photosensitive unit 41 is aligned with one light-passing hole 621.

As shown in FIGS. 2-4, the collimation layer 70 is arranged on the second substrate 60. The collimation layer 70 includes a plurality of collimators 71. Each collimator 71 defines a light-through hole 711 which is aligned with a corresponding photosensitive unit 41. That is, the light-through hole 711 faces the photosensitive unit 41. Specifically, the light-through hole 711 can also be aligned with a light-passing hole 621. That is, the center line of the light-through hole 711 can coincide with the center line of the light-passing hole 621. A light signal can pass through the light-through hole 711 and then the light-passing hole 621 to reach the photosensitive unit 41. The material of the collimators 71 may be same as that of the shutter layer 62. For example, both the collimators 71 and the shutter layer 62 are made from the light-absorbing material. When reaching a body of a collimator 71, a light signal will be partially or completely absorbed. For example, when the light signal reaches a side wall of the collimator 71 or an inner wall of the light-through hole 711, the light signal will be absorbed by the collimator 71, and thus light signals whose propagation direction is coincided with the extension direction of the center line of the light-through hole 711 passes through the light-through hole 711 and reaches the photosensitive unit 41. Thus, collimation of light signals is realized, and there are less interference light signals received by the photosensitive unit 41. The orthographic projection of the plurality of collimator 71 on the second substrate 60 may be located in the shutter layer 62, which makes the collimator 71 not block the display unit 61 and ensures that the display device 100 has a better display effect.

The light-through hole 711 extends in a direction perpendicular to the display surface 91, so that only light signals whose propagation direction is perpendicular to the display surface 91 pass through the light-through hole 711. In other words, only light signals which are propagated vertically downward from the display surface 91 can only pass through the light-through hole 711. A ratio of a section width of the light-through hole 711 to a depth of the light-through hole 711 is less than 0.2. The depth of the light-through hole 711 may means a depth along the center line of the light-through hole 711, and the section width of the light-through hole 711 may indicates the maximum of sizes of patterns cut by planes perpendicular to the center line of the light-through hole 711. The ratio may be 0.1, 0.111, 0.125, 0.19, 0.2, or other values, in which the corresponding collimator 71 has good collimation effect on light signals.

In one example, the collimation layer 70 further includes a substrate 72, the substrate 72 may be substantially transparent, and the collimators 71 are formed on the substrate 72. In another example, the collimation layer 70 may only include the collimators 71, and the collimators 71 are formed on the second substrate 60 by coating, sputtering, or the like.

The second polarization layer 80 is arranged on the collimation layer 70, and the second polarization layer 80 can be a polarizer or a polarizing film specifically.

As shown in FIG. 2 and FIG. 3, a cover plate 90 is arranged on the second polarization layer 80. The cover plate 90 can be made from glass, sapphire, or other materials. The cover plate 90 includes a display surface 91 and a back surface 92. Light signals sent from the display device 100 enters outside after passing through the display surface 91, and external lights enters the display device 100 after passing through the display surface 91. The back surface 92 can be bonded to the second polarization layer 80. In some examples, the display device 100 may also not include the cover plate 90, and in this case the display device 100 has the display surface formed on the second polarization layer 80.

The display surface 91 includes a display area 911. The display area 911 refers to an area that can be used for displaying images, and the display area 911 may be a rectangle, a circle, a rounded rectangle, a rectangle with "bangs", which is not limited herein. In addition, in some examples, the display surface 91 can also include a non-display area. The non-display area can be arranged along edges of the display area 911, and the non-display area can be used for being connected with the housing 200. A ratio of the display area 911 on the display surface 91 can be any value such as 80%, 90%, 100%.

In embodiments of the present disclosure, projections of the plurality of photosensitive units 41 on the display surface 91 are located in the display area 911. Thus, the plurality of photosensitive units 41 can performs imaging for an object touching the display area 911. For an example of a finger touching the display area 911, the plurality of photosensitive units 41 can performs imaging for the fingerprint touching the display area 911 and be used for fingerprint identification.

As shown in FIG. 2 and FIG. 3, specific details of the imaging of the display device 100 will be described in the following. A light signal La emitted from the display device 100 passes through the first polarization layer 20, the first substrate 30, the photosensitive layer 40, the liquid crystal layer 50, the second substrate 60, the collimation layer 70, the second polarization layer 80, and the cover plate 90 successively and then enters outside, and an external light signal also passes through the cover plate 90, the second polarization layer 80, the collimation layer 70, the second substrate 60, and the liquid crystal layer 50 and then reaches the photosensitive layer 40. If the light signal just reaches the photosensitive units 41 in the photosensitive layer 40, the photosensitive units 41 generates an electrical signal indicating the intensity of the light signal. Thus, the intensity of the electrical signals of the plurality of photosensitive units 41 can indicates the intensity distribution of light signals entering the display device 100.

In an example where a user's finger 2000 touches the display surface 91, the finger 2000 touches a predetermined area of the display surface 91 when the display device 100 is emitting a light signal La, and the light signal La is reflected by the finger 2000 to obtain a light signal L1. The light signal L1 then enters the display device 100, and then the light signal L1 passes through the cover plate 90 and the second polarization layer 80 firstly. As the light signal L1 is propagated in a direction same with the extension direction of a light-through hole 711 and a light-passing hole 611, the light signal L1 further passes through the light-through hole 711 and the light-passing hole 621, and then the light signal L1 passes through the liquid crystal layer 50 and reaches a photosensitive unit 41 after passing through light-through hole 711 and the light-passing hole 621. For light signals which are propagated in a direction different with the extension direction of a light-through hole 711 and a light-passing hole 611, the light signals fails to pass through the light-through hole 711 and the light-passing hole 621 after passing through the cover plate 90 and the second polarization layer 80, and then fails to a photosensitive unit 41 aligned with the light-through hole 711 and the light-passing hole 621.

It can be understood that there are peaks and troughs in a fingerprint. When the finger 2000 touches the display surface 91, the peaks directly contact with the display surface 91, and there is a gap between the troughs and the display surface 91. After the light signal La reaches the peaks and the troughs, a light signal reflected by the peaks (referred to as a first light signal hereinafter) has an intensity different from that of a light signal reflected by the troughs (referred to as a second light signal hereinafter). Thus, there is a difference between intensities of an electrical signal generated by the received first light signal (referred to as a first electrical signal hereinafter) and an electrical signal generated by the received second light signal (referred to as a second electrical signal hereinafter). The imaging chip 300 obtains an image of the fingerprint according to the distribution of the first electrical signals and the second electrical signals. The image of the fingerprint may further used for fingerprint recognition.

It can be understood that a user touches an area above any area with a photosensitive unit 41, and then a purpose that a fingerprint can be imaged and identified may be achieved. When a photosensitive unit 41 is arranged under any of the display area 911, the user touches any position of the display area 911 and then a purpose that a fingerprint can be imaged and identified may be achieved, without limiting some specific positions of the display area 911. Meanwhile, the user may also touch multiple positions of the display area 911 at same time through multiple fingers, or multiple users touch multiple positions of the display area 911 simultaneously, thus, a purpose that multiple fingerprints can be imaged and identified may be achieved. Therefore, this can enrich verification methods and applicable scenarios of the electronic device 1000. For example, only after the multiple fingerprints pass verification at the same time, authorization is given and the multiple users can play games on the same electronic device 1000.

Of course, similar to the finger of the user touching the display area 911, any object (e.g. the user's arm, forehead, clothing, flowers and plants, etc.) that can reflect the light signal La touches the display area 911 and then an imaging process is performed for a texture of the surface of the object. The subsequent processes after the imaging process can be set according to the user's requirements, which are not limited herein.

Figure 8:
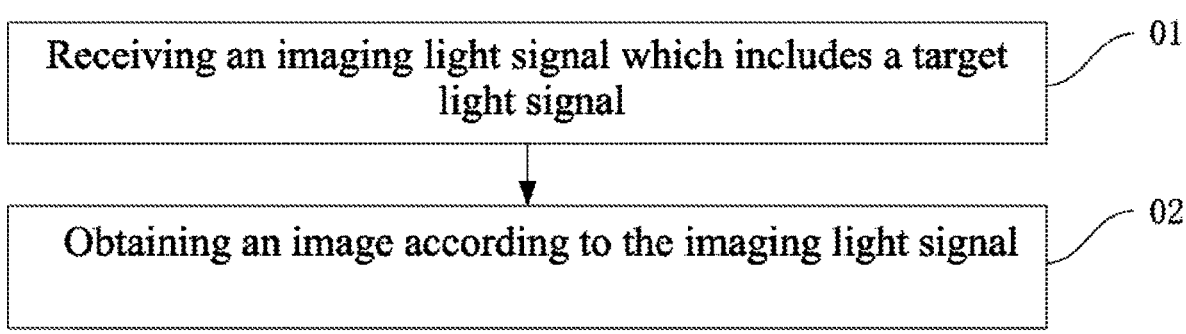
FIG. 8 is a flow chart of a method for obtaining an image according to another embodiment of the present disclosure.

As shown in FIG. 8, a method for obtaining an image is also disclosed according to some embodiments of the present disclosure. The method can be applied for the above-mentioned display device 100. The method includes actions/operations in the following blocks.

At 01, the method receives an imaging light signal which includes a target light signal.

At 02, the method obtains an image according to the imaging light signal.

The block 01 is performed by the photosensitive layer 40, and the block 02 is performed by the imaging chip 300. The imaging light signal refers to all light signals received by the photosensitive units 41, and the target light signal means light signals that reaches the photosensitive units 41 after passing through the light-through holes 711 and the light-passing holes 621. The specific implementation details for the blocks 01 and 02 can refer to the above description of the display device 100, and will not be described herein.

Therefore, in the electronic device 1000 and the method according to embodiments of the present disclosure, the photosensitive units 41 can receive the light signals from outside and passing through the light-through holes 711 and the light-passing holes 621. According to the light signals, an image of an object touching the display device 100 can be obtained. The image can be used for fingerprint identification. At the same time, a ratio of an area of multiple photosensitive units 41 to an area of a display surface 91 of the display device 100 becomes large as the multiple photosensitive units 41 are distributed according to demands. Thus, fingerprint identification can be performed on a large region for users, and then the user experience is good.

Figure 9:
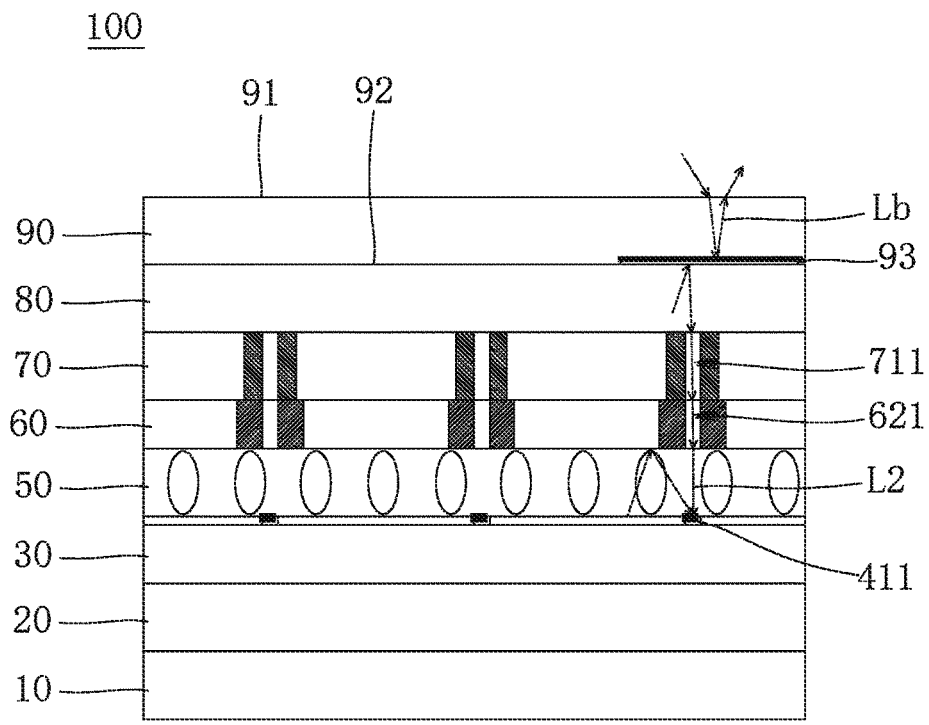
FIG. 9 is a side view of a display device according to some embodiments of the present disclosure.

As shown in FIG. 5 and FIG. 9, in some embodiments, the photosensitive units 41 includes a plurality of stray light photosensitive units 411. An ink layer 93 is arranged on the back surface 92 of the cover plate 90, and an area where the stray light sensing units 411 is located corresponds to the ink layer 93. That is, the area where the stray light sensing units 411 is located faces the ink layer 93. The ink layer 93 may be used for blocking a light signal Lb penetrating into the cover plate 90 from outside.

In practical application, a part of light signals emitted from the backlight layer 10 penetrates directly from the display surface 91, another part of the light signals is reflected once or more times between the display surface 91 and the backlight layer 10, and yet another part of the light signals may reach the photosensitive units 41 and cause interference to the imaging of the display device 100. That is, the imaging light signal for imaging further includes an interference light signal L2, which is reflected by the display device 100 and reaches the photosensitive units 41 on the photosensitive layer 40.

The ink layer 93 is arranged at a position corresponding to the stray light photosensitive units 411 on the back surface 92. Most of lights in the display device 100 are absorbed by the ink layer 93 after reaching the ink layer 93, and a small part (for example, 4%) is reflected by the ink layer 93. The ink layer 93 may simulate the reflection effect of the cover plate 90 on the light signal inside the display device 100. In addition, the stray light photosensitive units 411 may receive the light signal L2 reaching the stray light sensitive units 411 from sides of the stray light photosensitive units 411. Generally speaking, the stray light photosensitive units 411 can receive the same interference light signal L2 as well as other photosensitive units 41. Meanwhile, the ink layer 93 can block (reflect or absorb) the light signal Lb penetrating into the cover plate 90 from outside, so that the stray light photosensitive unit 411 can only receive the interference light signal L2, and other photosensitive units 41 can simultaneously receive the interference light signal L2 and the light signal Lb penetrating into the cover plate 90 from outside.

The type and performance of the stray light photosensitive units 411 are the same as those of the other photosensitive units 41. The stray light photosensitive units 411 transmits the interference electrical signal generated by the interference light signal L2 to the imaging chip 300, and the imaging chip 300 performs image-calibration according to the interference electrical signal during imaging, for example, subtracting the interference electrical signal from the imaging electrical signal generated by the imaging light signal as a final electrical signal for imaging, in order to obtain a more accurate image and improve the accuracy of image identification.

In one example, the stray light sensitive units 411 and the other photosensitive units 41 are CCD image sensors. In this case, subtracting the interference electrical signal from the imaging electrical signal may be performed in the imaging chip 300. That is, both the interference electrical signal and the imaging electrical signal are transmitted to the imaging chip 300, and the imaging chip 300 subtracts the interference electrical signal from the imaging electrical signal. Subtracting the interference electrical signal from the imaging electrical signal may also be performed in an analog-to-digital converter. That is, both the interference electrical signal and the imaging electrical signal are transmitted to the analog-to-digital converter, and the analog-to-digital converter subtracts the interference electrical signal from the imaging electrical signal and transmits an electrical signal obtained after the subtracting. In another example, the stray light sensitive units 411 and the other photosensitive units 41 are CMOS image sensors. In this case, subtracting the interference electrical signal from the imaging electrical signal may be performed in the imaging chip 300. That is, both the interference electrical signal and the imaging electrical signal are transmitted to the imaging chip 300, and the imaging chip 300 subtracts the interference electrical signal from the imaging electrical signal. Subtracting the interference electrical signal from the imaging electrical signal may also be performed in the photosensitive units 41. At this case, each photosensitive unit 41 includes a first storage area, a second storage area, and a logic subtraction circuit. The generated imaging electrical signal is stored in the first storage area of the photosensitive unit 41, and the interference electrical signal is sent from the stray light sensitive units 411 and stored in the second storage area of the photosensitive unit 41. The interference electrical signal is subtracted from the imaging electrical signal by the logic subtraction circuit, and the electrical signal obtained after the subtracting is sent to the imaging chip 300. The above description of the subtracting the interference electrical signal from the imaging electrical signal are only illustrative and not constructed as the limitation of the present disclosure.

In one example, the ink layer 93 is arranged near an edge of the back surface 92, and the stray light photosensitive units 411 are arranged at a corresponding edge of the photosensitive layer 40. For example, the stray light photosensitive units 411 are arranged in an area 'a' as shown in FIG. 5, wherein the area 'a' is located on the leftmost column and the rightmost column of the array of photosensitive units 41 as shown in FIG. 5. That is, the area 'a' includes the leftmost column and the rightmost column of the array of photosensitive units 41 that are adjacent to two opposite edges (i.e. left edge and right edge) of the array of the photosensitive units 41 respectively. Thus, the ink layer 93 is avoided to have too much influence on the display effect of the display device 100. Specifically, the photosensitive units 41 may be arranged in an array with multiple rows and multiple columns, and the stray light photosensitive units 411 may be arranged at a position near an edge of the array, such as one to three columns adjacent to the edge of the array or one to three rows adjacent to the edge of the array, so as to adapt to the position where the ink layer 93 is located.

Further, as there are multiple stray light photosensitive units 411, there generate multiple interference electrical signals accordingly which have different sizes, in one example, the interference electrical signals are averaged and then the averaged interference electrical signal is subtracted from the imaging electrical signal during performing the subtraction operation. In another example, photosensitive units 41 and stray light photosensitive units 411 are partitioned respectively, where each region include at least one photosensitive unit 41, or includes at least one stray light photosensitive unit 411. According to a location of each region including a photosensitive unit 41 (referred to as a first region hereinafter) and a location of each region including a stray light photosensitive unit 411 (referred to as a second region hereinafter), second regions that are closest to each first region are determined. For each photosensitive unit 41 in each first region, an interference electrical signal generated by a stray light photosensitive unit 411 in a second region that is closest to the first region is subtracted from an imaging electrical signal generated by the photosensitive unit 41, such that a final electrical signal of the photosensitive unit 41 for imaging is obtained. If the second region includes multiple stray light photosensitive units 411, an average value of multiple interference electrical signals generated by the multiple stray light photosensitive units 411 in the second region are obtained, and then the average value is subtracted from the imaging electrical signal, such that a final electrical signal for imaging is obtained. It can be appreciated that the closer a distance between a stray light photosensitive unit 411 and a photosensitive unit 41 is, the closer amounts of interference light signals received by the stray light photosensitive unit 411 and the photosensitive unit 41 are, and the closer the generated interference electrical signals are. Thus, more accurate the final electrical signal for imaging after subtracting the interference electrical signal from the imaging electrical signal are.

Figure 10:
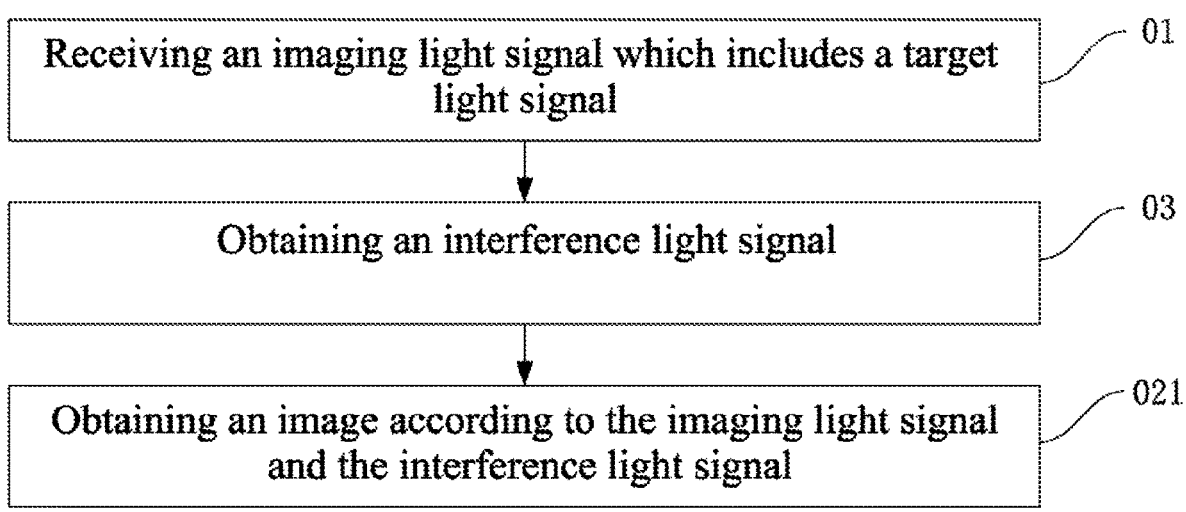
FIG. 10 is a flow chart of a method for obtaining an image according to another embodiment of the present disclosure.

As shown in FIG. 10, in some embodiments, the method further includes obtaining an interference light signal at 03.

The actions/operations at 02 include obtaining the image according to the imaging light signal and the interference light signal at 021.

The block 03 is performed by the stray light photosensitive units 411, and the block 021 is performed by the imaging chip 300. The specific implementation details for the blocks 03 and 021 can refer to the above description, and will not be described herein.

Figure 11:
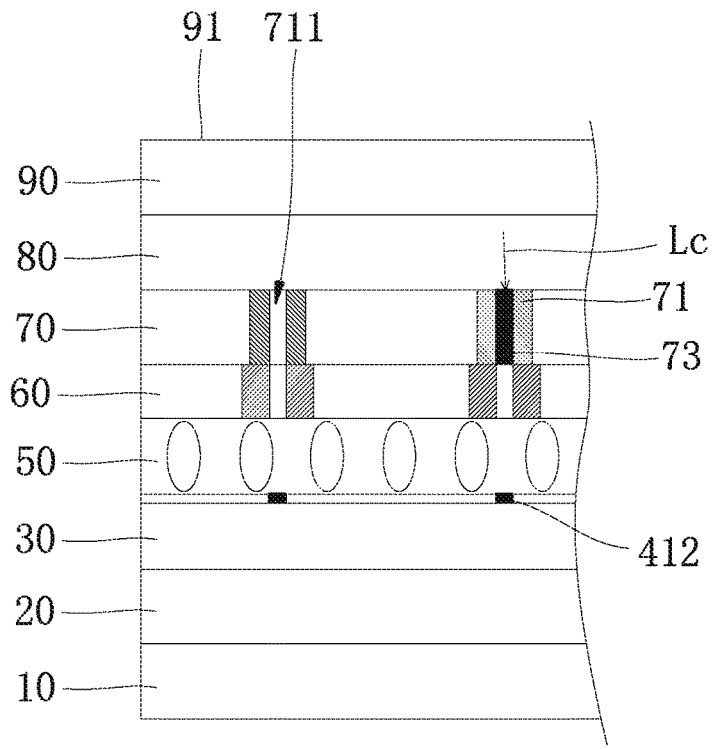
FIG. 11 is a side view of a display device according to some embodiments of the present disclosure.

As shown in FIG. 5 and FIG. 11, in some embodiments, the photosensitive unit 41 includes a plurality of noise photosensitive units 412, and the display device 100 further includes a plurality of blockers 73. A blocker 73 is arranged on a collimator 71 facing a corresponding one of the noise photosensitive units 412. The blocker 73 is used for blocking a light-through hole 711 of the collimator 71 facing the corresponding noise photosensitive unit 412.

During using, the temperature of a photosensitive unit 41 or the temperature of the environment changes, and as the temperature changes, the performance of the photosensitive unit 41 may change. This results in inconsistent electrical signals generated when light signals with same intensity are received. Therefore, calibration is performed for interference resulted from the changed temperatures during an imaging.

In this embodiment, the type and performance of the noise photosensitive units 412 are the same as those of the other photosensitive units 41. The blocker 73 blocks the light-through hole 711, so that the noise photosensitive units 412 cannot receive a light signal. The noise photosensitive units 412 generates an electrical signal when being used, and as the noise photosensitive units 412 cannot receive a light signal, the electrical signal generated by the noise photosensitive units 412 indicates a noise electrical signal resulted from material and the changed temperatures. Other photosensitive units 41 generate a noise electrical signal simultaneously and receive an imaging light signal to generate an imaging electrical signal. The noise photosensitive units 412 transmit the noise electrical signal to the imaging chip 300. The imaging chip 300 performs image-calibration for the noise electrical signal according to the noise electrical signal during imaging, for example, subtracting the noise electrical signal from the imaging electrical signal generated from the imaging light signal as a final electrical signal for imaging, in order to obtain a more accurate image and improve the accuracy of image identification. Similar to a case where the photosensitive units 41 include a plurality of stray light photosensitive units 411, subtracting the noise electrical signal from the imaging electrical signal may be performed in the imaging chip 300, and may also be performed in other components, which is not described herein.

Specifically, the blocker 73 may also be made from light-absorbing material. The blocker 73 can be filled in the light-through hole 711, and the blocker 73 and the corresponding collimator 71 can be made together. In one example, blockers 73 may also be arranged on the noise photosensitive units 412 directly, such that the noise photosensitive units 412 cannot receive a light signal completely. The noise photosensitive units 412 may be arranged at a region near an edge of an array of photosensitive units 41. The noise photosensitive unit 412 may be arranged at a region adjacent to the stray light photosensitive units 411 such as one to three columns in the array or one to three rows in the array, which is not limited. The noise photosensitive units 412 are arranged in an area 'b' as shown in FIG. 5, and the area 'b' is located on the second column from the left and the second column from the right of the array of photosensitive units 41 as shown in FIG. 5. That is, the area 'b' includes the second column near the left edge of the array and the second column near the right edge of the array.

Further, as there are multiple noise photosensitive units 412, and there generate multiple noise electrical signals accordingly which have different sizes, in one example, the noise electrical signals are averaged and then the averaged noise electrical signal is subtracted from the imaging electrical signal during performing the subtraction operation. In another example, photosensitive units 41 and noise photosensitive units 412 are partitioned respectively, where each region include at least one photosensitive unit 41, or includes at least one noise photosensitive unit 412. Then, according to a location of each region including a photosensitive unit 41 (referred to as a first region hereinafter) and a location of each region including a noise photosensitive unit 412 (referred to as a third region hereinafter), third regions that are closest to each first region are determined. For each photosensitive unit 41 in each first region, a noise electrical signal generated by a noise photosensitive unit 412 in a third region that is closest to the first region is subtracted from an imaging electrical signal generated by the photosensitive unit 41, such that a final electrical signal of the photosensitive unit 41 for imaging is obtained. If the third region includes multiple noise photosensitive units 412, an average value of multiple noise electrical signals generated by the multiple noise photosensitive units 412 in the third region are obtained, and then the average value is subtracted from the imaging electrical signal, such that a final electrical signal for imaging is obtained. It can be appreciated that the closer a distance between a noise photosensitive unit 412 and a photosensitive unit 41 is, the closer temperatures of the noise photosensitive unit 412 and the photosensitive unit 41 are, and the closer the generated noise electrical signals are. Thus, more accurate the final electrical signal for imaging are after subtracting the noise electrical signal from the imaging electrical signal.

As shown in FIG. 5, in some embodiments, the circuit units 42 include photosensitive circuit units 421 and one or more noise circuit unit 422. A photosensitive circuit unit 421 is connected with a photosensitive unit 41, and the noise circuit unit 422 is not connected with a photosensitive unit 41.

A photosensitive circuit itself has hardware noise which can cause a circuit noise signal, and the circuit noise signal affects the strength of the electrical signal finally transmitted to the imaging chip 300. Therefore, calibration is performed for interference resulted from the circuit noise signal during imaging.

In this embodiment, the noise circuit unit 422 is not connected with a photosensitive unit 41, and the circuit noise signals generated on the noise circuit unit 422 are resulted from hardware noise of the noise circuit unit 422 itself. The noise circuit unit 422 transmits the circuit noise signal to the imaging chip 300. The imaging chip 300 performs image-calibration according to the circuit noise signal during imaging, for example, subtracting the circuit noise signal from the imaging electrical signal generated from the imaging light signal as a final electrical signal for imaging, in order to obtain a more accurate image and improve the accuracy of image identification.

Specifically, a plurality of circuit units 42 can be arranged in an array with multiple rows and multiple columns. Noise circuit units 422 are arranged in at least one complete row and column, and the noise circuit unit 422 can be distributed in any row and column. A circuit noise signal generated by the noise circuit units 422 is more comprehensive, and calibration effect becomes better when image-calibration is performed according to the circuit noise signal. Noise circuit units 422 may also be arranged at an edge of the array of the circuit units 42, or near the stray light photosensitive units 411 and the noise photosensitive units 412 mentioned above. A distribution range of noise circuit units 422 covers one to five columns completely and one to five rows completely, which is not limited herein. In an example of FIG. 5, the noise circuit units 422 are arranged in an area 'c' of the photosensitive layer 40, and the area 'c' is located on the third column from the left, the third column from the right, the upper row, and the bottom row of the array of circuit units 42 as shown in FIG. 5. That is, the area 'c' includes the third column near the left edge of the array and the third column near the right edge of the array.

Further, as there are multiple noise circuit units 412, and there generate multiple circuit noise signals accordingly which have different sizes, in one example, the circuit noise signals are averaged and then the averaged circuit noise signal is subtracted from the imaging electrical signal during performing the subtraction operation. In another example, photosensitive units 41 and noise circuit units 422 are partitioned respectively, where each region include at least one photosensitive unit 41, or includes at least one noise circuit unit 422. Then, according to a location of each region including a photosensitive unit 41 (referred to as a first region hereinafter) and a location of each region including a noise circuit unit 422 (referred to as a fourth region hereinafter), fourth regions that are closest to each first region are determined. For each photosensitive unit 41 in each first region, a circuit noise signal generated by a circuit noise unit 422 in a fourth region that is closest to the first region is subtracted from an imaging electrical signal generated by the photosensitive unit 41, such that a final electrical signal of the photosensitive unit 41 for imaging is obtained. If the fourth region includes multiple circuit noise units 422, an average value of multiple circuit noise signals generated by the multiple circuit noise units 422 in the fourth region are obtained, and then the average value is subtracted from the imaging electrical signal, such that a final electrical signal for imaging is obtained.

Figure 12:
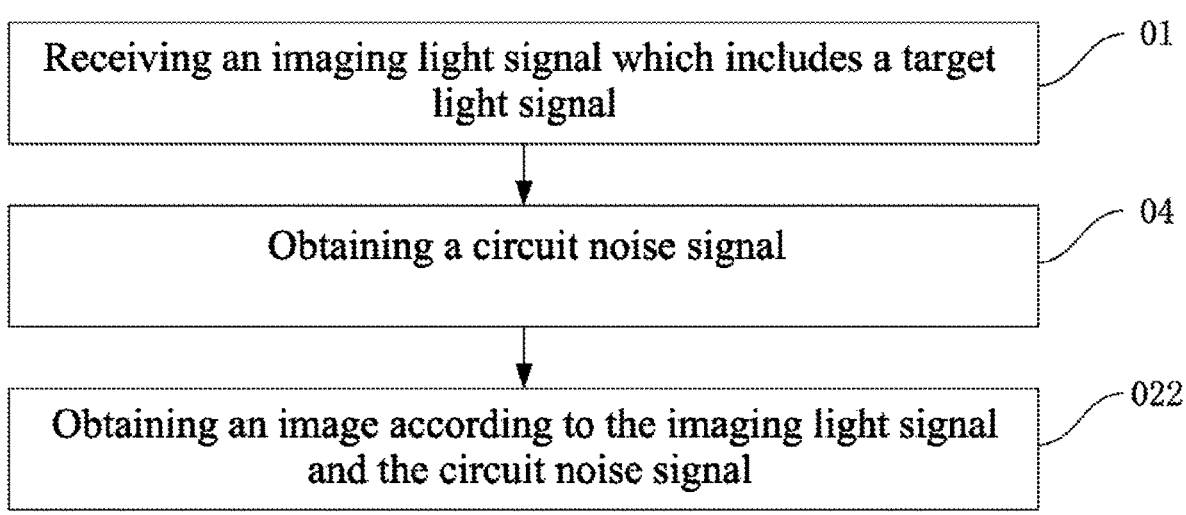
FIG. 12 is a first flow chart of a method for obtaining an image according to another embodiment of the present disclosure.

As shown in FIG. 12, in some embodiments, the method further includes obtaining a circuit noise signal at 04. The actions/operations at 02 include obtaining the image according to the imaging light signal and the circuit noise signal at 022.

The block 04 is performed by the circuit noise units 422, and the block 022 is performed by the imaging chip 300. The specific implementation details for the blocks 04 and 022 can refer to the above description, and will not be described herein.

As shown in FIG. 5, in some embodiments, the photosensitive units 41 include a plurality of infrared photosensitive units 413. The infrared photosensitive units 413 are used for detecting infrared lights.

As there may exist infrared lights in the external environment, the infrared lights may penetrate into certain objects and enter the display device 100. The infrared lights may penetrate into the user's finger and then pass through the display surface 91, the through light-passing holes 711, and the light-passing holes 621, and then the infrared lights are received by the photosensitive units. However, the infrared lights are not associated with the user's fingerprint, and infrared electrical signal generated from the infrared lights (i.e. infrared light signals) may have interference on the imaging of the imaging chip 300. Therefore, calibration is performed for the interference resulted from the infrared light signals during imaging.

The infrared photosensitive units 413 only receives an infrared signal and generates an infrared electrical signal according to the infrared signal. Other photosensitive units 41 simultaneously receives the infrared signal and a visible light signal and generate an imaging electrical signal based on the infrared signal and the visible light signal. The infrared electrical signal is further transmitted to the imaging chip 300. The imaging chip 300 performs image-calibration according to the infrared electrical signal during imaging, for example, subtracting the infrared electrical signal from the imaging electrical signal generated from the imaging light signal as a final electrical signal for imaging, in order to obtain a more accurate image and improve the accuracy of image identification. Similar to a case where the photosensitive units 41 include a plurality of stray light photosensitive units 411, subtracting the infrared electrical signal from the imaging electrical signal may be performed in the imaging chip 300, and may also be performed in other components, which is not described herein.

Specifically, the infrared photosensitive units 413 may be spaced from each other. For example, the infrared photosensitive units 413 are evenly distributed in array of photosensitive cell 41. A ratio of the infrared photosensitive units 413 to the photosensitive units 41 may be a small value, such as 1%, 7%, 10%. Combined with FIG. 3, a touched position may be sensed in the display device 100 when the display surface 91 is touched by a user, and the imaging chip 300 reads an infrared electrical signal generated by one or more infrared photosensitive units 413 corresponding to the touched position and performs image-calibration according to the infrared electrical signal.

Figure 13:
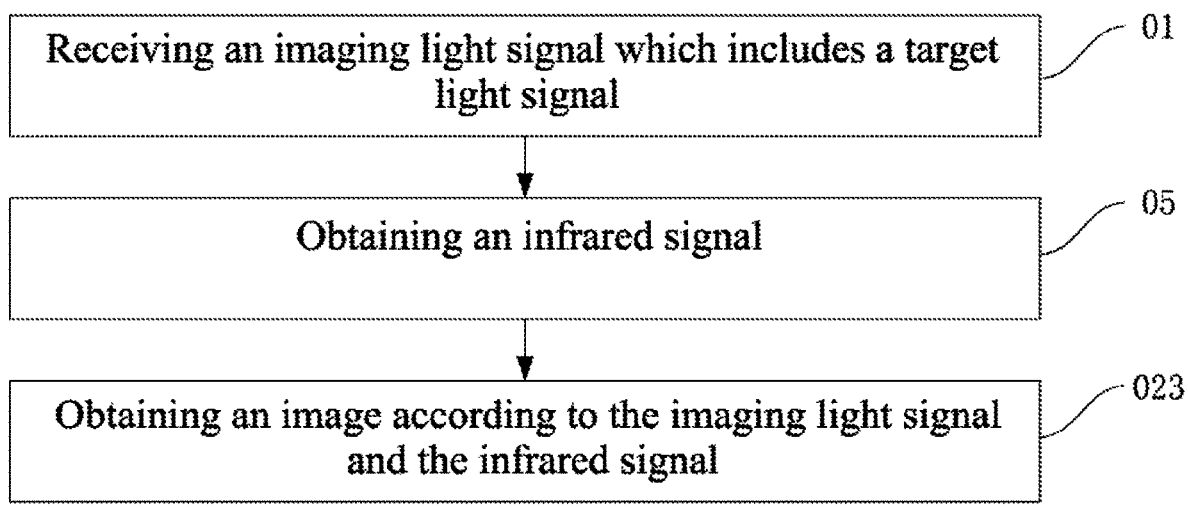
FIG. 13 is a second flow chart of a method for obtaining an image according to another embodiment of the present disclosure.

As shown in FIG. 13, in some embodiments, the method further includes obtaining an infrared signal at 05. The actions/operations at 02 include obtaining the image according to the imaging light signal and the infrared signal at 023.

The block 05 is performed by the infrared photosensitive units 413, and the block 023 is performed by the imaging chip 300. The specific implementation details for the blocks 05 and 023 can refer to the above description, and will not be described herein.

Furthermore, in some embodiments, there are no infrared photosensitive units 413 while an infrared cut-off film may be arranged between the photosensitive layer 40 and the display surface 91. For example, the infrared cut-off film is arranged between the second substrate 60 and the collimation layer 70. The infrared cut-off film has a high transmittance for visible lights, which can reach 90% or more, and a low transmittance for infrared light signals, to prevent external infrared light signals from reaching the photosensitive units 41.

Further, as there are multiple infrared photosensitive units 413, there generate multiple infrared electrical signals accordingly which have different sizes, in one example, the infrared electrical signals are averaged and then the averaged infrared electrical signal is subtracted from the imaging electrical signal during performing the subtraction operation. In another example, photosensitive units 41 and infrared photosensitive units 413 are partitioned respectively, where each region include at least one photosensitive unit 41, or includes at least one infrared photosensitive unit 413. Then, according to a location of each region including a photosensitive unit 41 (referred to as a first region hereinafter) and a location of each region including an infrared photosensitive unit 413 (referred to as a fifth region hereinafter), fifth regions that are closest to each first region are determined. For each photosensitive unit 41 in each first region, an infrared electrical signal generated by a infrared photosensitive unit 413 in a fifth region that is closest to the first region is subtracted from an imaging electrical signal generated by the photosensitive unit 41, such that a final electrical signal of the photosensitive unit 41 for imaging is obtained. If the fifth region includes multiple infrared photosensitive units 413, an average value of multiple infrared electrical signals generated by the multiple infrared photosensitive units 413 in the fifth region are obtained, and then the average value is subtracted from the imaging electrical signal, such that a final electrical signal for imaging is obtained. It can be appreciated that the closer a distance between an infrared photosensitive unit 413 and a photosensitive unit 41 is, the closer amounts of infrared lights received by the infrared photosensitive unit 411 and the photosensitive unit 41 are, and the closer the generated interference electrical signals are. Thus, more accurate the final electrical signal for imaging after subtracting the infrared electrical signal from the imaging electrical signal are.

As shown in FIG. 5, any one or more of the stray light photosensitive units 411, the noise photosensitive units 412, the noise circuit units 422, and the infrared photosensitive units 413 may be disposed on the same photosensitive layer 40 at the same time. For example, the stray light photosensitive units 411 and the noise photosensitive units 412 are arranged at the same time. In this case, the imaging chip 300 performs image-calibration according to an interference electrical signal and a noise electrical signal during imaging, such as subtracting the interference electrical signal and the noise electrical signal from an imaging electrical signal generated by an imaging light signal to obtain a final electrical signal for imaging. For another example, the stray light photosensitive units 411 and the noise circuit units 422 are arranged at the same time. In this case, the imaging chip 300 performs image-calibration according to an interference electrical signal and a circuit noise signal during imaging, such as subtracting the interference electrical signal and the circuit noise signal from an imaging electrical signal generated by an imaging light signal to obtain a final electrical signal for imaging. For yet another example, the noise circuit units 422 and the infrared photosensitive units 413 are arranged at the same time. In this case, the imaging chip 300 performs image-calibration according to a circuit noise signal and an infrared electrical signal during imaging, such as subtracting the circuit noise signal and the infrared electrical signal from an imaging electrical signal generated by an imaging light signal to obtain a final electrical signal for imaging. For yet another example, the noise photosensitive units 412, the noise circuit units 422, and the infrared photosensitive units 413 are arranged at the same time. In this case, the imaging chip 300 performs image-calibration according to a noise electrical signal, a circuit noise signal, and an infrared electrical signal during imaging, such as subtracting the noise electrical signal, the circuit noise signal, and the infrared electrical signal from an imaging electrical signal generated by an imaging light signal to obtain a final electrical signal for imaging. For yet another example, a stray light photosensitive unit 411, a noise photosensitive unit 412, and an infrared photosensitive unit 413 are arranged at the same time. In this case, the imaging chip 300 performs image-calibration according to an interference electrical signal, a noise electrical signal, a circuit noise signal, and an infrared electrical signal during imaging, such as subtracting the interference electrical signal, the noise electrical signal, the circuit noise signal, and the infrared electrical signal from an imaging electrical signal generated by an imaging light signal to obtain a final electrical signal for imaging.

Figure 14:
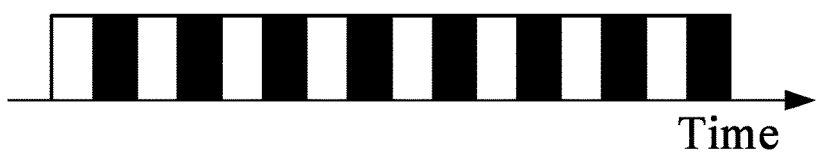
FIG. 14 is a schematic diagram showing effective operation time distribution of display-driving units and photosensitive units in a same row or column of an electronic device according to some embodiments of the present disclosure.

As shown in FIG. 6, in some embodiments, a plurality of display-driving units 1a1 are arranged in an array with multiple rows and multiple columns, and a plurality of photosensitive units 41 are arranged in another array with multiple rows and multiple columns. each row of the first array is located between any adjacent two rows of the second array, and each column of the first array is located between any adjacent two columns of the second array. The effective operating time of the display-driving units 1a1 is alternated with that of the photosensitive units 41 in a same row or column, as shown in FIG. 14.

Specifically, during fabrication, the display-driving layer 1a is firstly manufactured on the first substrate 30, and then the photosensitive layer 40 is manufactured on the display driving layer 1a. The display-driving units 1a1 are spaced from the photosensitive units 41. In the array, there may be multiple photosensitive units 41 and multiple display-driving units 1a1 located in a same row or column at the same time, and the effective operating time of the display-driving units 1a1 is alternated with that of the photosensitive units 41 in a same row or column. In an example of FIG. 6, display-driving units 1a1 in the bottom row operate at same time, and photosensitive units 41 in the bottom row operate simultaneously. The operation time of the display-driving units 1a1 is intersected with that of the photosensitive units 41, which can reduce interference from the display-driving units 1a1 when the photosensitive units 41 operate and improve the accuracy of imaging.

In some embodiments, the imaging chip 300 and the driving chip may be arranged in a same flexible circuit board through Chip On Film (COF) technique, and the flexible circuit board is bonded to pins of the display driving layer 1a and pins of the photosensitive layer 40. Pins of the display driving layer 1a may be arranged in a row, and pins of the photosensitive layer 40 may be arranged in another row. The flexible circuit board is bonded to both rows of pins.

In the description of the present specification, the description with references to the terms "one embodiment", "some embodiments", "example", "specific example", or "some examples", and the like, means that a specific feature, structure, material, or characteristic described in connection with the embodiment or example is included in at least one embodiment or example of the present disclosure. Thus, the illustrative descriptions of the terms throughout this specification are not necessarily referring to the same embodiment or example of the present disclosure. Furthermore, the specific features, structures, materials, or characteristics may be combined in any suitable manner in one or more embodiments or examples.

In addition, terms such as "first", "second", and the like are used herein for purposes of description, and are not intended to indicate or imply relative importance or significance or to imply the number of indicated technical features. Thus, the feature defined with "first", "second", and the like may include one or more of such a feature. In the description of the present disclosure, "a plurality of" means two or more, such as two, three, and the like, unless specified limitation otherwise.

Although explanatory embodiments of the present disclosure have been shown and described above, it would be appreciated that the above embodiments are illustrative, and cannot be construed to limit the present disclosure. Changes, modifications, alternatives, and transformations can be made to the embodiments by those skilled in the art, and the scope of the present disclosure is limited by the claims and equivalents thereof.

What is claimed is:

1. A display device, comprising a first substrate, a photosensitive layer, a liquid crystal layer, a second substrate, and a collimation layer that are stacked successively and a blocker;
   wherein the photosensitive layer comprises a plurality of photosensitive units;
   wherein the second substrate comprises a plurality of display units and a shutter layer having a plurality of first holes, any adjacent two of the plurality of display units are spaced by the shutter layer, and each of the first holes is located between any adjacent two different ones of the plurality of display units;
   wherein the collimation layer comprises a plurality of collimators, each of the plurality of collimators defines a second hole, the second hole is communicated with a corresponding one of the first holes and faces a corresponding one of the photosensitive units, and a light signal passes through the second hole and the corresponding one of the first holes and reaches the corresponding one photosensitive unit;
   wherein the plurality of photosensitive units are arranged in an array, the plurality of photosensitive units comprise a plurality of stray light photosensitive units, a plurality of noise photosensitive units, and a plurality of infrared photosensitive units;
   wherein the plurality of stray light photosensitive units are distributed in two columns of the array, one of the two columns is adjacent to one of two opposite edges of the array, and the other of the two columns is adjacent to the other of the two opposite edges of the array;
   wherein the plurality of noise photosensitive units are distributed in two second columns of the array, one of the two second columns of the array is near one of two opposite edges of the array, and the other of the two second columns of the array is near to the other of the two opposite edges of the array;
   wherein the plurality of infrared photosensitive units are distributed in a part of remaining columns of the array; and
   wherein the blocker is arranged on a collimator facing a corresponding one of the noise photosensitive units and is configured for blocking the second hole of the collimator.

2. The display device of claim 1, wherein the display device has a display surface comprising a display area, and projections of the plurality of photosensitive units on the display surface are located in the display area.

3. The display device of claim 1, wherein the display device has a display surface, and an extension direction of the second hole is perpendicular to the display surface.

4. The display device of claim 1, wherein a ratio of a section width of the second hole to a depth of the second hole is less than 0.2.

5. The display device of claim 1, wherein the shutter layer is located between the collimation layer and the plurality of photosensitive units, and projections of the plurality of collimators on the second substrate are located on the shutter layer.

6. The display device of claim 1, wherein the shutter layer and the collimators are made from a same light-absorbing material, and reflective material is arranged on a side of each of the plurality of photosensitive units facing the first substrate.

7. The display device of claim 1, wherein the display device further comprises a cover plate comprising a display surface and a back surface that are opposite to each other, an ink layer is arranged on the back surface, projections of the stray light photosensitive units on the back surface are located in an area where the ink layer is located, and the ink layer is configured for blocking an external light signal penetrating into the cover plate.

8. The display device of claim 7, wherein the ink layer is arranged near an edge of the back surface.

9. The display device of claim 1, wherein the photosensitive layer further comprises a plurality of circuit units comprising a plurality of photosensitive circuit units and one or more noise circuit unit, and each of the plurality of the photosensitive units is connected with one photosensitive circuit unit, each noise circuit unit is separated from one of the plurality of the photosensitive units by one of the photosensitive circuit units.

10. The display device of claim 9, wherein the plurality of circuit units are arranged in an array comprising a plurality of rows and a plurality of columns, and the one or more noise circuit unit is arranged in at least one whole row and one whole column of the array.

11. The display device of claim 1, wherein a plurality of display-driving units are arranged on the first substrate and in a first array comprising a plurality of rows and a plurality of columns;
wherein the plurality of photosensitive units are arranged in a second array comprising a plurality of rows and a plurality of columns;
wherein each row of the first array is located between any adjacent two rows of the second array, and each column of the first array is located between any adjacent two columns of the second array; and
wherein the display-driving units have an effective operation time alternated with that of respective ones of the photosensitive units in a same row or column.

12. An electronic device, comprising:
a housing; and
a display device installed in the housing and comprising a first substrate, a photosensitive layer, a liquid crystal layer, a second substrate, and a collimation layer that are stacked successively and a blocker;
wherein the photosensitive layer comprises a plurality of photosensitive units;
wherein the second substrate comprises a plurality of display units and a shutter layer having a plurality of first holes, any adjacent two of the plurality of display units are spaced by the shutter layer, and each of the first holes is located between any adjacent two different ones of the plurality of display units;
wherein the collimation layer comprises a plurality of collimators, each of the plurality of collimators defines a second hole communicated with a corresponding one of the first holes and facing a corresponding one of the photosensitive units, and a light signal passes through the second hole and the corresponding one of the first holes and reaches the corresponding one photosensitive unit;
wherein the plurality of photosensitive units are arranged in an array, and the plurality of photosensitive units comprise a plurality of stray light photosensitive units, a plurality of noise photosensitive units, and a plurality of infrared photosensitive units;
wherein the plurality of stray light photosensitive units are distributed in two columns of the array, one of the two columns is adjacent to one of two opposite edges of the array, and the other of the two columns is adjacent to the other of the two opposite edges of the array;
wherein the plurality of noise photosensitive units are distributed in two second columns of the array, one of the two second columns of the array is near one of two opposite edges of the array, and the other of the two second columns of the array is near to the other of the two opposite edges of the array;
wherein the plurality of infrared photosensitive units are distributed in a part of remaining columns of the array; and
wherein the blocker is arranged on a collimator facing a corresponding one of the noise photosensitive units and is configured for blocking the second hole of the collimator.

13. An electronic device, comprising a display assembly comprising a first substrate, a photosensitive layer, a liquid crystal layer, a second substrate, and a collimation layer that are stacked successively and a blocker;
wherein the photosensitive layer comprises a plurality of photosensitive units;
wherein the second substrate comprises a plurality of display units and a shutter layer having a plurality of first holes, any adjacent two of the plurality of display units are spaced by the shutter layer, and one of the first holes is located between any adjacent two different ones of the plurality of display units;
wherein the collimation layer comprises a plurality of collimators, each of the plurality of collimators defines a second hole, the second hole is communicated with a corresponding one of the first holes and faces a corresponding one of the plurality of photosensitive units, and a light signal passes through the second hole and the corresponding one of the first holes and reaches the corresponding one photosensitive unit;
wherein the plurality of photosensitive units are arranged in an array, and the plurality of photosensitive units comprise a plurality of stray light photosensitive units, a plurality of noise photosensitive units, and a plurality of infrared photosensitive units;
wherein the plurality of stray light photosensitive units are distributed in two columns of the array, one of the two columns is adjacent to one of two opposite edges of the array, and the other of the two columns is adjacent to the other of the two opposite edges of the array;
wherein the plurality of noise photosensitive units are distributed in two second columns of the array, one of the two second columns of the array is near one of two opposite edges of the array, and the other of the two second columns of the array is near to the other of the two opposite edges of the array;
wherein the plurality of infrared photosensitive units are distributed in a part of remaining columns of the array; and
wherein the blocker is arranged on a collimator facing a corresponding one of the noise photosensitive units and is configured for blocking the second hole of the collimator.

* * * * *